(12) United States Patent
Yonge, III et al.

(10) Patent No.: US 8,675,754 B1
(45) Date of Patent: Mar. 18, 2014

(54) HYBRID MODULATION SCHEMES USED IN DATA COMMUNICATION

(75) Inventors: Lawrence Winston Yonge, III, Summerfield, FL (US); Harper Brent Mashburn, Gainesville, FL (US); Srinivas Katar, Gainesville, FL (US); Arun Avudainayagam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/806,805

(22) Filed: Aug. 19, 2010

Related U.S. Application Data

(60) Provisional application No. 61/235,338, filed on Aug. 19, 2009.

(51) Int. Cl.
*H04L 5/12* (2006.01)

(52) U.S. Cl.
USPC .......................................... 375/261; 375/308

(58) Field of Classification Search
USPC ................. 375/308, 298, 261, 260, 330, 305; 370/207
See application file for complete search history.

(56) References Cited

U.S. PATENT DOCUMENTS

| | | | |
|---|---|---|---|
| 5,966,412 A | 10/1999 | Ramaswamy | |
| 7,260,159 B2 | 8/2007 | Lee et al. | |
| 7,274,653 B1 | 9/2007 | Settle et al. | |
| 2004/0066844 A1* | 4/2004 | Moon et al. | 375/222 |
| 2006/0171283 A1* | 8/2006 | Vijayan et al. | 369/94 |
| 2006/0215790 A1* | 9/2006 | Dibiaso et al. | 375/330 |
| 2006/0274855 A1* | 12/2006 | DiBiaso et al. | 375/308 |
| 2007/0195907 A1* | 8/2007 | Wang et al. | 375/267 |
| 2007/0268977 A1* | 11/2007 | Wang et al. | 375/261 |
| 2008/0279168 A1* | 11/2008 | Kalhan et al. | 370/342 |

OTHER PUBLICATIONS

"Hierarchical Modulation," DVBT Terrestrial, WP-01, Mar. 2000, 1 page.

* cited by examiner

*Primary Examiner* — Aristocratis Fotakis
(74) *Attorney, Agent, or Firm* — DeLizio Gilliam, PLLC

(57) ABSTRACT

Transmitting information between stations in a network includes: modulating first main information and auxiliary information onto a first portion of a signal according to a predetermined constellation having multiple regions and the same sub-constellation within each region having multiple points, with the first main information being modulated using a first selected region of the constellation, and the auxiliary information being modulated using a first selected point of the sub-constellation within the first selected region; modulating second main information and a copy of the auxiliary information onto a second portion of the signal according to the constellation, with the second main information being modulated using a second selected region of the constellation, and the copy of the auxiliary information being modulated using a second selected point of the sub-constellation within the second selected region, where the second selected point occurs at a different portion of the sub-constellation than the first selected point; and transmitting the signal from a first station in the network to a second station in the network.

49 Claims, 14 Drawing Sheets

| Preamble 305 | Legacy frame control 310 | Payload 320 |

FIG. 3A

| Preamble 305 | Legacy frame control 310 / New generation frame control 315 | Payload 320 |

FIG. 3B

HYBRID MODULATION SCHEMES USED IN DATA COMMUNICATION

CROSS REFERENCE TO RELATED APPLICATIONS

This application claims priority to U.S. Provisional Application 61/235,338, filed Aug. 19, 2009, the entire content of which is incorporated herein by reference.

TECHNICAL FIELD

This description relates to hybrid modulation schemes used in data communication.

BACKGROUND

As newer devices emerge in data communication technology, more and more functionalities are introduced in them. The new functionalities may require additional fields in data packets or frames communicated between these devices for some of these functionalities. By including the optional information in the modified frames in a backward compatible way, older devices are still able to receive and decode the frames even if they do not receive and decode the optional information. In some systems, hierarchical modulation schemes can be used to provide some form of backward compatibility.

SUMMARY

In one aspect, in general, a method for transmitting information between stations in a network includes modulating first main information and auxiliary information onto a first portion of a signal (e.g., a first carrier of the signal) according to a predetermined constellation having multiple regions and the same sub-constellation within each region having multiple points, with the first main information being modulated using a first selected region of the constellation, and the auxiliary information being modulated using a first selected point of the sub-constellation within the first selected region; modulating second main information and a copy of the auxiliary information onto a second portion of the signal (e.g., a second carrier of the signal) according to the constellation, with the second main information being modulated using a second selected region of the constellation, and the copy of the auxiliary information being modulated using a second selected point of the sub-constellation within the second selected region, where the second selected point occurs at a different portion of the sub-constellation than the first selected point; and transmitting the signal from a first station in the network to a second station in the network.

Aspects can include one or more of the following features.

The method further comprises modulating third main information and an additional copy of the auxiliary information onto a third portion of the signal according to the constellation, with the third main information being modulated using a third selected region of the constellation, and the additional copy of the auxiliary information being modulated using a third point of the sub-constellation within the third selected region that occurs at a portion of the sub-constellation corresponding to the first point or the second point.

The signal includes multiple copies of the auxiliary information, with each copy being modulated on a respective carrier of the signal, and at least some of the carriers are modulated using different mappings between points in the sub-constellation and auxiliary information bits.

Each of the auxiliary information and the copy of the auxiliary information is modulated on a different respective carrier of the signal using points in the sub-constellation having different amplitudes.

A total number of copies of the auxiliary information modulated using a point having a first of the different amplitudes is approximately equal to a total number of copies of the auxiliary information modulated using a point having a second of the two different amplitudes, and an amplitude intermediate between the two different amplitudes corresponds to an amplitude of a point used to modulate the first main information and the second main information as a copy of the first main information.

A total number of copies modulated using points having either of the two different amplitudes is even.

A total number of copies modulated using a point having the first of the two different amplitudes is exactly equal to a total number of copies modulated using a point having the second of the two different amplitudes.

The first portion of the signal comprises a first carrier included in at least one symbol of the signal, and the second portion of the signal comprises a second carrier included in at least one symbol of the signal.

The signal includes orthogonal frequency division multiplexing (OFDM) symbols each including multiple carriers having different frequencies separated by integral multiples of an inverse of a time duration of the symbols.

The first carrier and the second carrier have different frequencies.

The first carrier is included in a first symbol of the signal and the second carrier is included in the first symbol of the signal.

The first carrier is included in a first symbol of the signal and the second carrier is included in a second symbol of the signal, and the first and second symbols do not overlap in time.

The second main information is different from the first main information.

The second main information is a copy of the first main information.

The auxiliary information is encoded as N bits, where $N \geq 1$, and the multiple points of the sub-constellation consist of 2N points, each point representing a different sequence of N bits.

The auxiliary information is encoded as one bit, and the multiple points of the sub-constellation consist of two points, each point representing a different value of the one bit.

The multiple predetermined regions of the constellation correspond to approximate phase angles of a quaternary phase shift keying (QPSK) modulation format.

The method further comprises transmitting the signal from the first station in the network to a third station in the network.

The second station demodulates the first main information and the second main information using the regions of the constellation.

The second station ignores the auxiliary information.

The third station demodulates the first main information and the second main information using the regions of the constellation, and demodulates the auxiliary information using the points in the sub-constellation.

Demodulating the auxiliary information includes computing a combination of a metric based on a complex amplitude of a point within the sub-constellation derived from the first portion of the signal and a metric based on a complex amplitude of a point within the sub-constellation derived from the second portion of the signal.

The complex amplitude of a point within the sub-constellation derived from the first portion of the signal includes at least one of a measured amplitude and phase of a carrier of the signal.

The complex amplitude of a point within the sub-constellation derived from the second portion of the signal includes at least one of a measured amplitude and phase of a carrier of the signal translated according to a change in a mapping between sub-constellation points and bits associated with the first selected point and a mapping between sub-constellation points and bits associated with the second selected point.

The second station demodulates the first main information and the second main information using the regions of the constellation.

The second station ignores the auxiliary information.

The first station modulates copies of the first main information onto multiple respective portions of the signal and modulates copies of the auxiliary information onto multiple respective portions of the signal.

Multiple portions of the signal that all carry copies of the first main information also carry copies of the auxiliary information.

The first station modulates copies of the first main information onto each of multiple respective portions of the signal and modulates copies of the auxiliary information onto each of the same respective portions of the signal.

The second station demodulates the auxiliary information using the points in the sub-constellation.

The second station demodulates the auxiliary information based on points in the sub-constellation after demodulating the first main information, and demodulates the copy of the auxiliary information based on points in the sub-constellation after demodulating the second main information.

The second station demodulates the copy of the auxiliary information based on points in the sub-constellation after demodulating the second main information.

The second station demodulates the auxiliary information based on points in the sub-constellation after translating a measured complex amplitude according to an estimated value of the first main information.

Generating the estimated value of the first main information includes checking for errors in the estimated value.

Checking for errors in the estimated value includes generating the estimated value using a forward error correction code.

Checking for errors in the estimated value includes generating the estimated value using a cyclic redundancy check code.

The first station includes the auxiliary information in the signal based on determining whether the signal is destined for at least one station capable of demodulating the auxiliary information.

The first main information and the second main information each comprise a portion of main frame control information related to transmission of a frame over the network, and the auxiliary information comprises auxiliary frame control information related to transmission of the frame over the network.

The main frame control information and auxiliary frame control information are broadcast to multiple of the stations in the network.

The auxiliary frame control information is used by a subset of fewer than all of the stations in the network receiving the frame.

The main frame control information is used by all of the stations in the network receiving the frame.

The stations in the network communicate over a powerline medium.

The auxiliary information is received from a forward error correction (FEC) encoder.

In another aspect, in general, a transmitter for transmitting information in a network includes: circuitry for modulating first main information and auxiliary information onto a first portion of a signal according to a predetermined constellation having multiple regions and the same sub-constellation within each region having multiple points, with the first main information being modulated using a first selected region of the constellation, and the auxiliary information being modulated using a first selected point of the sub-constellation within the first selected region; circuitry for modulating second main information and a copy of the auxiliary information onto a second portion of the signal according to the constellation, with the second main information being modulated using a second selected region of the constellation, and the copy of the auxiliary information being modulated using a second selected point of the sub-constellation within the second selected region, where the second selected point occurs at a different portion of the sub-constellation than the first selected point; and circuitry for transmitting the signal over the network.

In another aspect, in general, a method for receiving information transmitted between stations in a network includes: receiving a signal at a first station in the network from a second station in the network; demodulating first main information and auxiliary information from a first portion of the signal according to a predetermined constellation, with demodulation of the first main information including measuring at least one of a phase angle and amplitude of the first portion of the signal, and demodulating the auxiliary information including measuring at least one of a phase angle and amplitude of the first portion of the signal transformed according to the demodulation of the first main information; demodulating second main information and a copy of the auxiliary information from a second portion of the signal according to the constellation, with demodulation of the second main information including measuring at least one of a phase angle and amplitude of the second portion of the signal, and demodulating the copy of the auxiliary information including measuring at least one of a phase angle and amplitude of the second portion of the signal transformed according to the demodulation of the second main information; and estimating the auxiliary information based on a combination of the measurement of the first portion of the signal and the measurement of the second portion of the signal, where a mapping between points in the constellation and bits for the first portion of the signal is different from a mapping between points in the constellation and bits for the second portion of the signal.

In another aspect, in general, a receiver for receiving information transmitted in a network includes circuitry for receiving a signal from the network; circuitry for demodulating first main information and auxiliary information from a first portion of the signal according to a predetermined constellation, with demodulation of the first main information including measuring at least one of a phase angle and amplitude of the first portion of the signal, and demodulating the auxiliary information including measuring at least one of a phase angle and amplitude of the first portion of the signal transformed according to the demodulation of the first main information; circuitry for demodulating second main information and a copy of the auxiliary information from a second portion of the signal according to the constellation, with demodulation of the second main information including measuring at least one of a phase angle and amplitude of the second portion of the signal, and demodulating the copy of the auxiliary information including measuring at least one of a phase angle and amplitude of the second portion of the signal transformed according to the demodulation of the second main information; and circuitry for estimating the auxiliary information based on a combination of the measurement of the first portion of the signal and the measurement of the second portion of the signal, where a mapping between points in the constellation and bits for the first portion of the signal is different from a mapping between points in the constellation and bits for the second portion of the signal.

In another aspect, in general, a method for transmitting information between stations in a network, the method comprising: modulating main information on portions of a signal according to a first level of a hierarchical modulation scheme associated with a constellation; and modulating auxiliary information on portions of a signal according to a second level of the hierarchical modulation scheme associated with a sub-constellation of the constellation; wherein the signal includes multiple copies of the auxiliary information with each copy being modulated on a respective portion of the signal, and at least some of the copies are modulated using different mappings between points in the sub-constellation and bits.

Among the many advantages of the invention (some of which may be achieved only in some of its various aspects and implementations) are the following.

The overall bit-error rate can be reduced by using a constellation-mapping diversity technique, described in more detail below, to make the average signal-to-noise ratio associated with different bits or bit sequences of auxiliary information be approximately the same. For example, loss and/or noise in the system can cause certain points in a constellation to be detected and demodulated with a lower signal-to-noise ratio than other points in the constellation.

For legacy devices that do not use the auxiliary information, the sub-constellation is treated as noise in demodulation process. However, if both the main information and the auxiliary information use a copy code to provide redundancy, the copies can be matched to the same carriers so that a carrier with copies of the same main information bits also has copies of the same auxiliary information bits. In this way, the constellation-mapping diversity can ensure that there are substantially equal numbers of copies spread on either side of a center of the region encoding the main information (e.g., one copy of a "0" bit being at a higher amplitude and another copy of that same "0" bit being at a lower amplitude). By combining the copies appropriately, the variation that would otherwise be treated as noise can be cancelled out and performance can be restored to be just as good as a legacy scheme without the auxiliary information being transmitted.

Other aspects and advantages will be apparent from the detailed description, drawings, appendices and claims.

DESCRIPTION OF DRAWINGS

FIGS. 3A and 3B are schematic diagrams of data frames.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
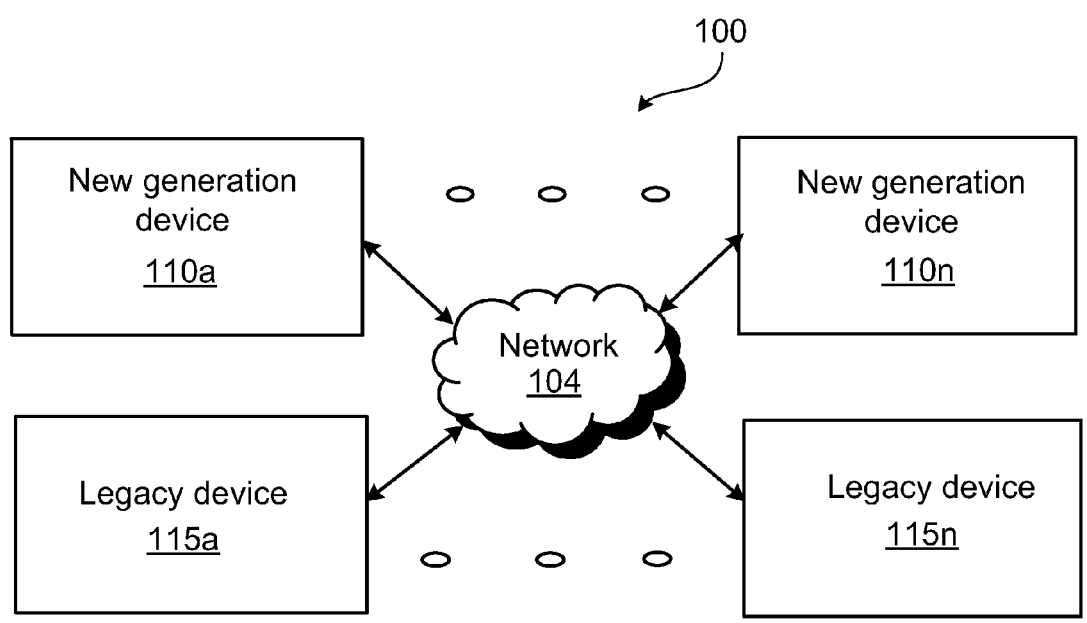
FIG. 1 is a block diagram of multiple devices communicating over a network.

FIG. 1 shows an exemplary system 100 in which one or more devices communicate with each other over a network. In broad overview, the system 100 includes multiple devices such as 110a-110n and 115a-115n each coupled to a shared communication medium 104 (which can include any of a variety of different types of physical transmission media or combination of multiple coupled media and/or wireless channels) over which signals from a transmitting station may propagate to another station coupled to the communication medium. Some of these devices may be new generation devices 110a-110n (110 in general) while others, such as 115a-115n (115 in general) may be old or legacy type devices.

In some implementations, data packets for a new generation device and a legacy device may be configured differently. For example, the new generation devices 110 may require additional frame control bits in the data packets. In some implementations a new generation device 110 communicates directly (unicast transmission) with another new generation device 110 or a legacy device 115. In such cases, the new generation device 110 may configure the transmitted data packets according to the recipient. However, in some implementations, a new generation device 115 may need to send a broadcast transmission that should be received and decoded at all other stations irrespective of whether the recipient station is a new generation or a legacy device. In such cases, the transmitted data packets cannot be configured according to the recipient and a unified transmission scheme that is understood by both new generation as well as legacy devices is required.

The present disclosure describes efficient methods and systems for configuring data packets such that they can efficiently carry additional information for new generation devices while being back compatible with legacy devices. For example, a new generation device 110a may be transmitting frames over the network 104. Such a station may be referred to as the transmitting station or the transmitting node. A portion of the frame may be demodulated and decoded by all nodes or receiving stations or devices on the network. In the above example, the new generation device 110n and the legacy devices 115a and 115n can be considered to be receiving devices, nodes or stations. Even though FIG. 1 shows only two new generation devices 110 and two legacy devices 115, any number of devices of either kind may be connected to the network 104. In some implementations, the devices may include a network interface module (not shown) that couples the station to the communication medium 104. The new generation devices may provide additional functionalities and/or capabilities than the legacy devices. For example, the additional functionalities and/or capabilities include, without limitation, higher physical layer data rates, advanced channel access techniques to improve efficiency and quality of service, advanced power save features and advanced data acknowledgement schemes. The network 104 may include one or more different types of network. For example, the network 104 may include a local area network (LAN), such as a company intranet or a home network. In some embodiments, the network 104 may include a metropolitan area network (MAN) or a wide area network (WAN) such as the Internet. In other implementations, the network 104 may include a combination of one or more different types of network. For example, a LAN such as the home network may be connected to an external access network. In such cases, one or more gateway devices may act as interfaces between two different networks.

In some implementations, the network 104 comprises one or more network devices connected to a shared medium such as a power line network or a phone line network or a coaxial cable network, or network devices communicating using wireless signals. The one or more network devices may be connected via one or more gateway devices to an external network such as the internet. The gateway device may be connected by any type and form of connection to the external network including a broadband connection, or a dialup connection or any other connection as apparent to one of skill in the art. The gateway device may be connected via one or more bridges to other home network segments. The home network segments may be based on a home networking technology such as one based on power-line networks.

The network 104 can be of any type and form and may include any of the following: a point to point network, a broadcast network, a computer network, a powerline network, an Asynchronous Transfer Mode (ATM) network, a Synchronous Optical Network (SONET), a Synchronous Digital Hierarchy (SDH) network, a wireless network and a wired network. If the network 104 is at least in part a wired network, the network 104 may include one or more of the following: coaxial cable, telephone wires, powerline wires, twisted pair wires or any other form and type of wire as apparent to one skilled in the art. The topology of the network 104 may be a bus, star or a ring topology or any other topology capable of supporting the operations described herein.

In some implementations, the network 104 may be a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) codes, line Viterbi codes, Reed-Solomon codes, concatenated codes, turbo codes, low density parity check code, etc., can be employed by the PHY to overcome errors.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
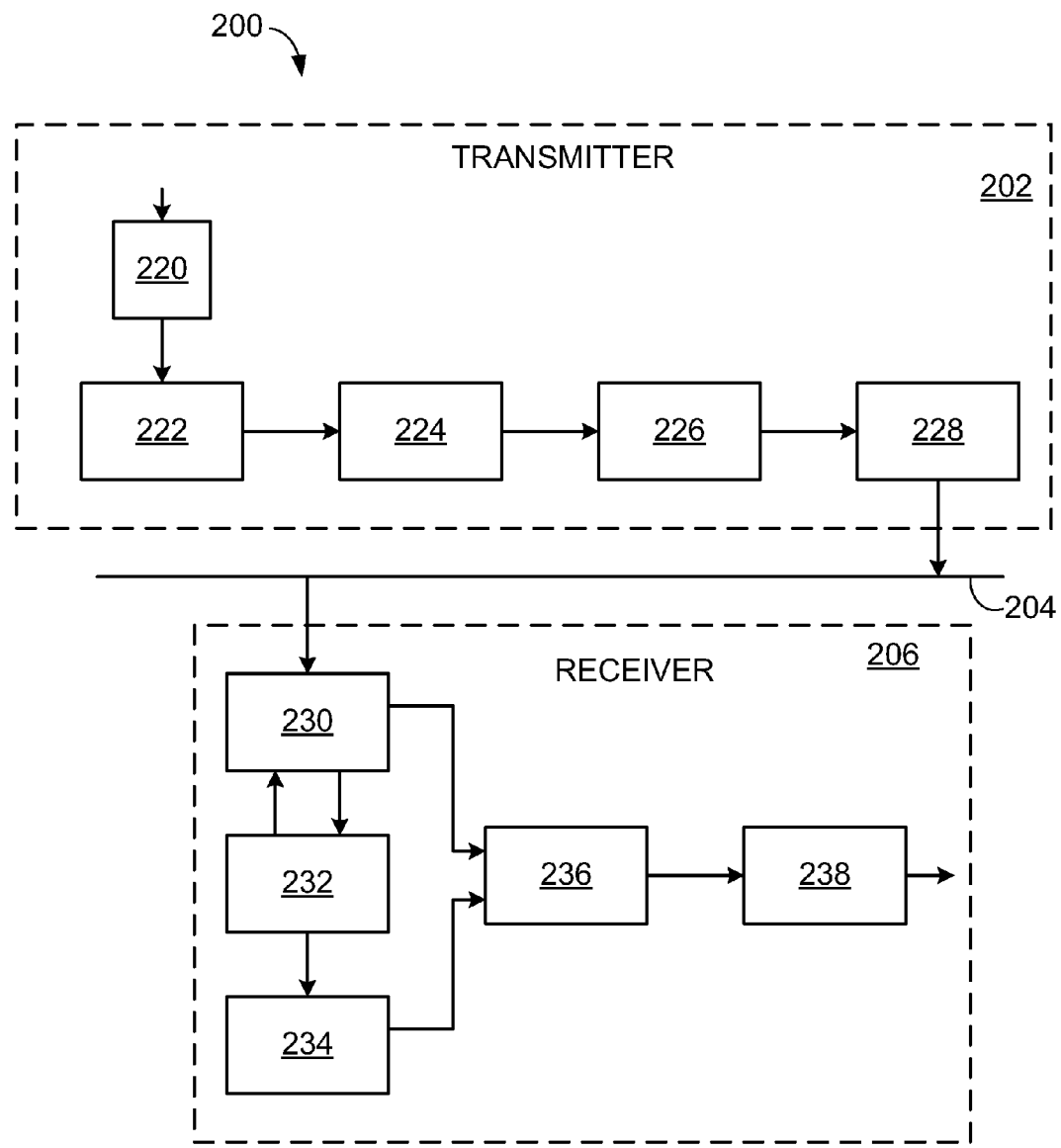
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}$=0). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \quad \text{Eq. (1)}$$

where the time index n goes from 1 to N, $A_i$ is the amplitude and $\Phi_i$ is the phase of the carrier with peak frequency $f_i$=(i/N)$f_R$, and $j=\sqrt{-1}$. In some implementations, the discrete Fourier transform corresponds to a fast Fourier transform (FFT) in which N is a power of 2.

A post-processing module 226 combines a sequence of consecutive symbols into a "symbol set" that can be transmitted as a continuous block over the communication medium 204. While the symbols in the symbol set do not overlap in time, the symbols may have cyclic extensions added to either end that do overlap in some implementations. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Referring now to FIG. 3A, a schematic diagram of an exemplary data frame for a legacy device is shown. In broad overview, the frame may include a payload 320 and overhead information. The payload part may include, for example, application data and/or management information, (e.g., in some cases, in the form of a packet of a higher layer protocol). The overhead information may include information associated with encoding or modulation of information in the payload or with a communication protocol used by the stations in the network. The overhead information may include, for example, a preamble 305 used to detect the start of the data unit and frame control information 310 (referred to in here as legacy frame control to distinguish with the additional frame control information required for new generation devices). The frame control information is also referred to as a header and usually placed between the preamble 305 and the payload 320. In some implementations, a trailing check sequence after the payload 320 may also be used to check the integrity of the transmission.

In some implementations, frame control information includes information necessary for the receiver to properly receive the payload. Examples of such information include the receiver's address, the physical layer parameters used for modulating the payload and the duration of the payload. In some implementations, the frame control information may also include information that is used by other nodes in the network for coordinating access to a shared channel. For example, the frame control can indicate if a transmitter has more data frame to send after the current frame or if the transmitter wants to pass control of the medium or channel to some other node after the current transmission. Referring now to FIG. 3B, a schematic diagram of an exemplary data frame for both legacy and new generation devices is shown. In some implementations, the data frame includes a payload 320 and overhead information that may include a preamble 305 and frame control information. The frame control information may include legacy frame control 310 and new generation frame control 315. The new generation frame control 315 may include any new information that needs to be communicated to the receiver and other stations in the network to support the new generation functions. For example, the new generation frame control can include new generation physical layer parameters that are used to modulate the data frame payload. In some cases, additional information and/or bits of the new generation frame control 315 may be transmitted sequentially after the legacy frame control 310. This can be done, for example by adding extensions to frame control fields of an existing frame (such as a physical layer protocol data unit (PPDU)). The overhead may be increased in such an approach. In some implementations, the new generation frame control information 315 are transmitted simultaneously with the legacy frame control information. Modulation techniques, as described below, may be used to send additional frame control information for the new generation devices in substantially the same time interval or slots in which the legacy frame control information 310 is transmitted.

Whether or not the additional information related to the new generation frame control 315 is sent depends on the nature of the receiver. For example, when a new generation transmitter sends a unicast transmission to a legacy receiver, the new generation frame control information 315 is not sent. Similarly, when a new generation transmitter sends a unicast transmission to a new generation receiver, both the legacy frame control 310 and the new generation frame control 315 are sent. Similarly, when a new generation transmitter is sending a broadcast transmission intended for both new generation and legacy receivers, both the new generation frame control 315 and the legacy frame control 310 are sent. When both the legacy frame control 310 and new generation frame control 315 are sent, modulation schemes such as described below can be used to efficiently send both frame control information without using additional overhead.

Figure 4:
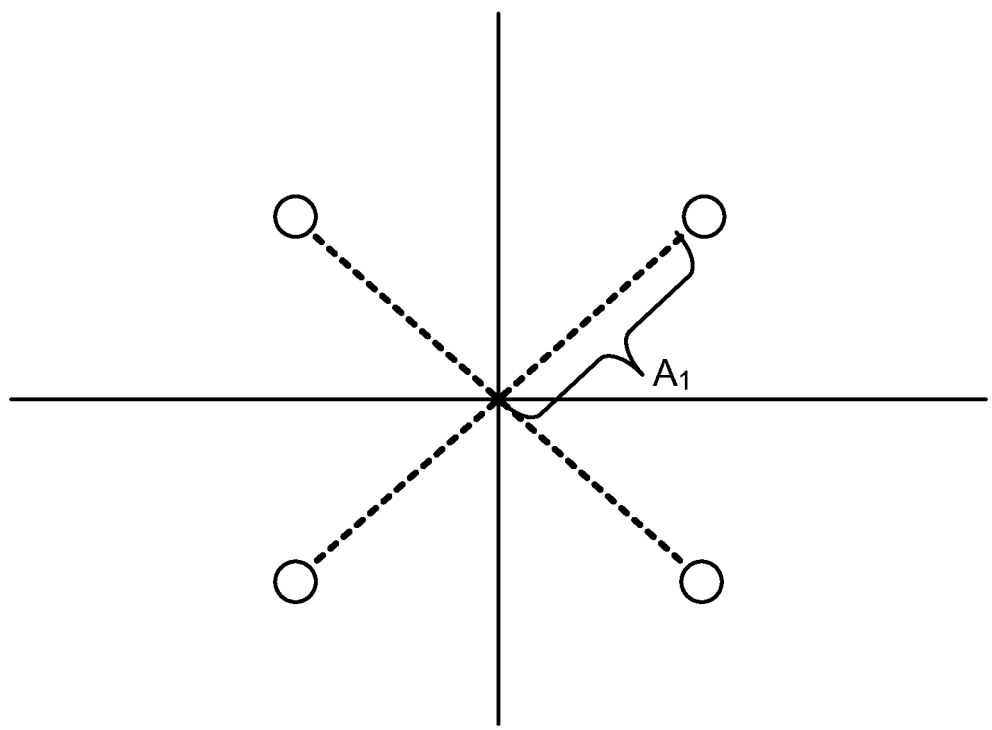
FIGS. 4-8 are constellation diagrams of modulation schemes.

Referring now to FIG. 4, a quaternary phase shift keying (QPSK) constellation is shown. Such QPSK constellations are often used for transmitting legacy frame control information 310. Only phase modulation is used to encode different bit sequences ("00", "01", "10" and "11" for example) in QPSK modulation. The amplitude of the signals modulated by different bit sequences remains substantially the same. For this reason, the four points in the constellation diagram are substantially at a same distance $A_1$ from the origin. Even though FIG. 5 shows a QPSK constellation, any other phase modulated signal such as bipolar phase shift keying (BPSK), 8-PSK, 16-PSK etc may be used for transmitting the frame control information.

Figure 5A:
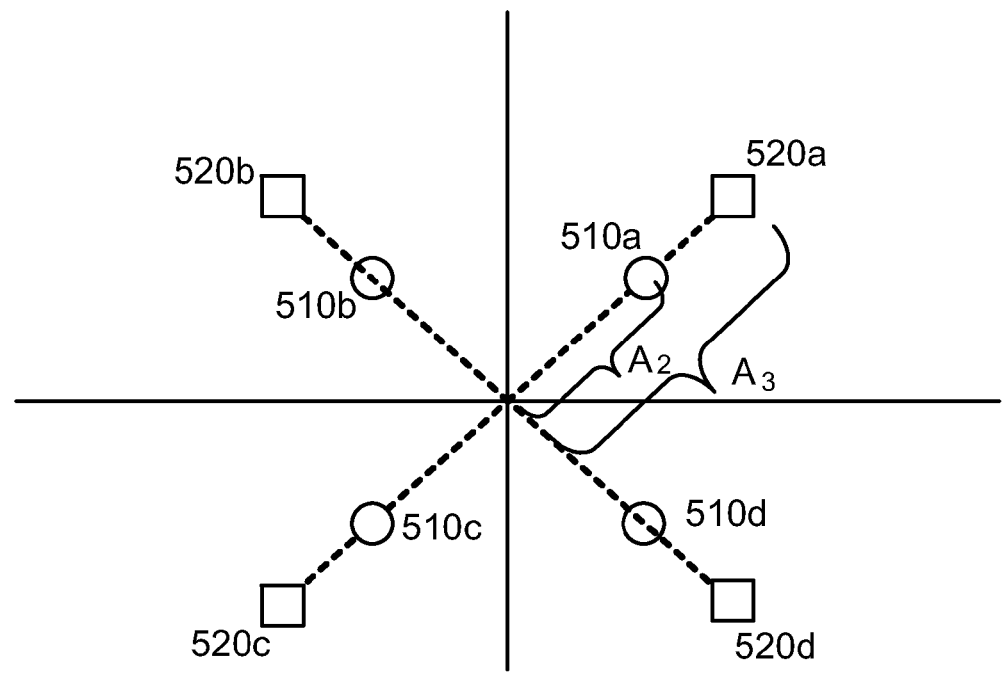
Figure 5B:
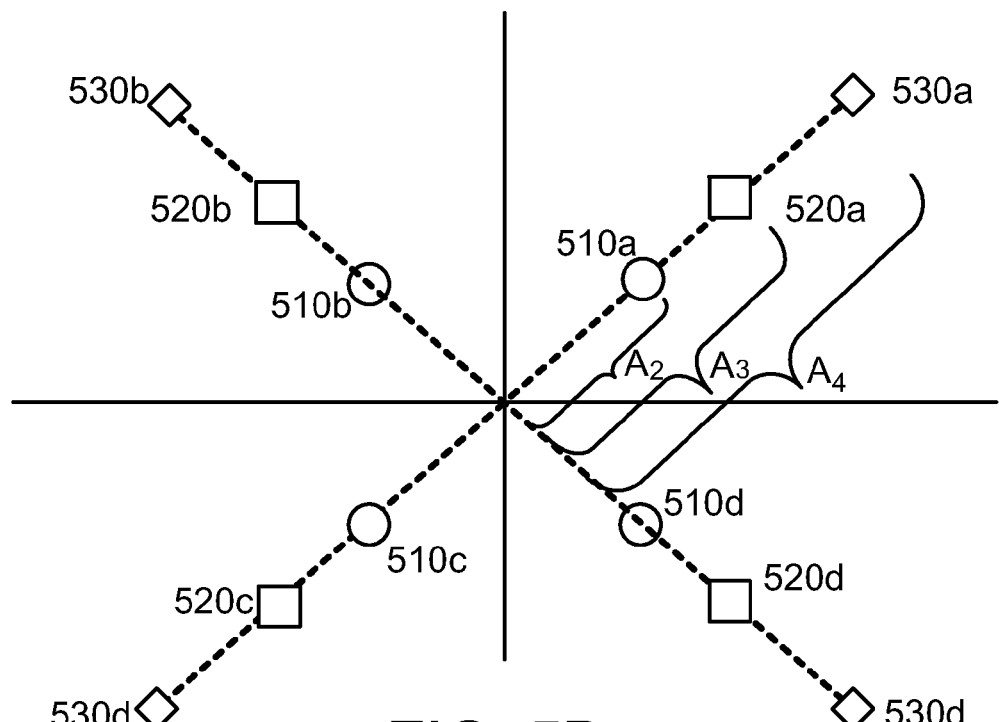

Referring now to FIGS. 5A and 5B, constellation diagrams related to hybrid phase and amplitude modulation schemes are shown. Such modulation schemes may be used for simultaneous transmission of information for legacy and new generation devices. In some implementations, the amplitude of a phase modulated signal may be changed in order to put more information on the signal. In one example, the constellation points 510a-510d are used for modulating information for a legacy device. The constellation point 510a may represent the bit sequence "10" to a legacy device that derives the information based on the phase of a transmitted signal. In order to transmit more information for the new generation devices, the amplitude of such a phase modulated signal may be varied to obtain, for example, two separate constellation points 510a and 520a that have different amplitude but substantially the same phase. The two constellation points can now be used to convey more information. For example, an extra bit of information may be transmitted by using 510a to transmit "100" and 520a to transmit "101." Legacy devices receiving such transmissions are blind to the difference between 510a and 520a and simply decode them to be the bit sequence "10." New generation devices, on the other hand, can detect the variation in amplitude and therefore detect the extra bit of information carried by the signal.

While the above example can be viewed as using pulse amplitude modulation (PAM) on top of quaternary phase shift keying (QPSK) modulation, the concept described herein can be extended for any combination of modulation schemes. For example, the modulation used for the legacy devices may be 8-QAM and QPSK may be used on top of it for modulating the information for new generation devices. Similarly, any of QPSK, PAM, BPSK, 8-QAM, 16-QAM, differential phase shift keying (DPSK), amplitude shift keying (ASK), frequency shift keying (FSK) or other modulation schemes may be used one on top of the other without deviating from the scope of the present disclosure.

In some implementations, the operations and systems described herein allows simultaneous modulation of auxiliary information along with main information. The main information may be information relevant to legacy devices, new generation devices or both. The auxiliary information may be relevant only to the new generation devices. In some implementations, the main information is modulated on a signal according to a first constellation related to the modulation scheme. The auxiliary information is then modulated on the same signal according to a sub-constellation, which may be viewed to be within a "region" centered around the point on the first constellation representing the main information. In some implementations of such a "hierarchical" modulation scheme, the modulation scheme associated with the sub-constellation is different from the modulation scheme associated with the first constellation. In some implementations, the sub-constellation and the first constellation may be related to a same modulation scheme.

In some implementations, finer granularity may also be achieved by using higher order modulations. For example, a second level auxiliary information may be modulated on the same signal according to a sub-sub constellation related to a third modulation scheme. In such cases, the sub-sub constellation may be viewed to be centered around a point in the sub-constellation. The third modulation scheme may be substantially the same as any of the first and second modulation schemes or may be different.

In some implementations, the above combination of modulation schemes may be used for encoding any bits of a data packet or frame. In some implementations, such combination of modulation schemes are used for particular parts of the frame such as the bits in the frame control fields. In some implementations, frame control information may be provided as a part of an error detection and/or correction scheme. For example, a forward error correction (FEC) encoder at the transmitter may be providing the frame control bits. In some implementations, multiple copies of each frame control bit are transmitted to increase robustness of the transmitted information. This is often referred to as copy coding. In some implementations, the copy coding is done prior to modulating the additional information on top of the existing modulation scheme for the legacy devices. In such cases, multiple copies of the new generation frame control information (or the copy-coded bits) are encoded over an existing modulation scheme in a way that there is at least some variation in characteristic among the constellation points corresponding to the different copies. For example, if one copy of a bit is sent at a given amplitude of a QPSK signal, another copy of the same bit is sent at a different amplitude. This deliberate introduction of diversity in the copy coded bits may be referred to as constellation-mapping diversity and is illustrated with an example below. In some implementations, each of the copy coded bits are modulated on a different carrier frequency.

Consider that a new generation frame control bit "1" is to be encoded on a QPSK modulation scheme used for legacy devices. The bit is copy coded such that 2 copies of the same bit are to be sent. Referring again to FIG. 5A, the first copy of the bit is encoded as the constellation point 510a which has an amplitude of $A_2$ and is related to the QPSK bit sequence "10.". The second copy of the bit, which may be encoded on another QPSK bit sequence "11", is encoded on a corresponding constellation point that has an amplitude A3. In some implementations, if more copy-coded versions of the same bit are to be transmitted, they may be encoded on constellation points having amplitudes substantially equal to either $A_2$ or $A3$. In some cases, the additional copy coded bits may be encoded on constellation points with a different amplitude $A_4$ as shown in FIG. 5B. While the characteristic diversity in this example is achieved by varying amplitude, other characteristics such as phase or a combination of amplitude and phase may also be used without deviating from the scope of the present disclosure. One of the reasons of introducing such variation in the copy coded bits is to achieve a substantially equal probability of error for both bits "0" and "1" at the receiver. This is illustrated below with an example.

Consider a transmitter where the FEC encoder produces N bits. Each of these bits is copy coded multiple times, for example 4 times, to produce 4N bits. The FEC decoder at the receiver, however, still expects only N bits and hence an inverse operation of the copy coding may be required. In some implementations, each bit at the receiver is detected via a detection algorithm. In some implementations received bits are detected via calculation of metrics such as likelihood ratios or log likelihood ratios (LLR) for each received bit. The quality of the detection, e.g. an LLR corresponding to a bit, may determine the quality of decoding. In other words, the better the metric of detection, lower the probability of error in detecting the bit. In the above example, the receiver may generate 4N such metrics corresponding to the 4N bits. The 4N metrics are combined in some way to produce a single metric for each of the N bits expected at the FEC decoder. The 4N metrics may be combined, for example, using maximal ratio combination. The combined metric may be a weighted sum of the individual metrics. The weights may be chosen in accordance with the signal to noise ratio (SNR) of the channel or carrier associated with the corresponding bit. In some implementations, the combined metric may be proportional to the sum of the individual metrics. In the current example, since PAM is being used, the metric is essentially proportional to the amplitude of the received constellation point. Therefore if a "0" is always transmitted using one amplitude (e.g. $A_2$) and a "1" is always transmitted using another amplitude (e.g. $A_3$), the combined metric corresponding to "1" will always be greater or lesser than the combined metric corresponding to "0" depending on whether $A_3$ is greater or lesser, respectively, than $A_2$. When equal diversity in amplitude is achieved for both bits, the combined metrics will be substantially equal to one another, thereby producing a substantially equal probability of detection for both bits.

For example, when only 3 copies each of "0" and "1" are transmitted and in each case the copies are transmitted with amplitudes $A_2$, $A_3$ and $A_4$, respectively, then the combined metric for either bit may be substantially proportional to $(A_2+A_3+A_4)$. Therefore deliberately introducing diversity in the transmission of copy coded bits can help achieve substantially the same probability of error for a "0" and a "1" (or for any of multiple possible sequences of bits that may be transmitted). In some implementations, such substantially the same probability of error may be achieved as long as a same set of amplitudes are used for transmitting the multiple "0"s and "1"s. In other words, if there are four copies each of "0"s and "1"s and the "0"s are transmitted using amplitudes $A_2$, $A_3$, $A_2$ and $A_4$, then any two copies of the "1"s should be transmitted using amplitude $A_2$ while one copy each should be transmitted using $A_3$ and $A_4$. In some implementations, the same ordering of the amplitudes may be followed for copies of both bits while in other cases the order may be ignored.

Figure 6:
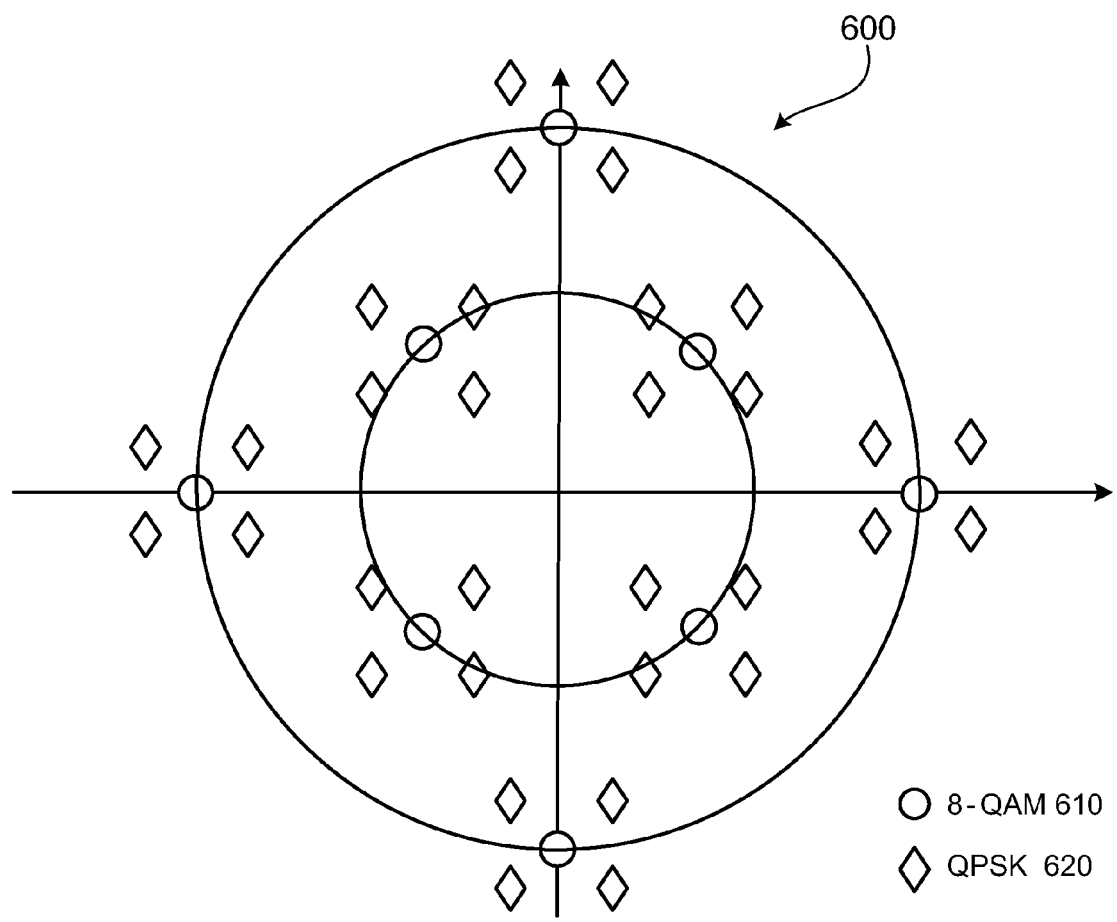
Figure 7:
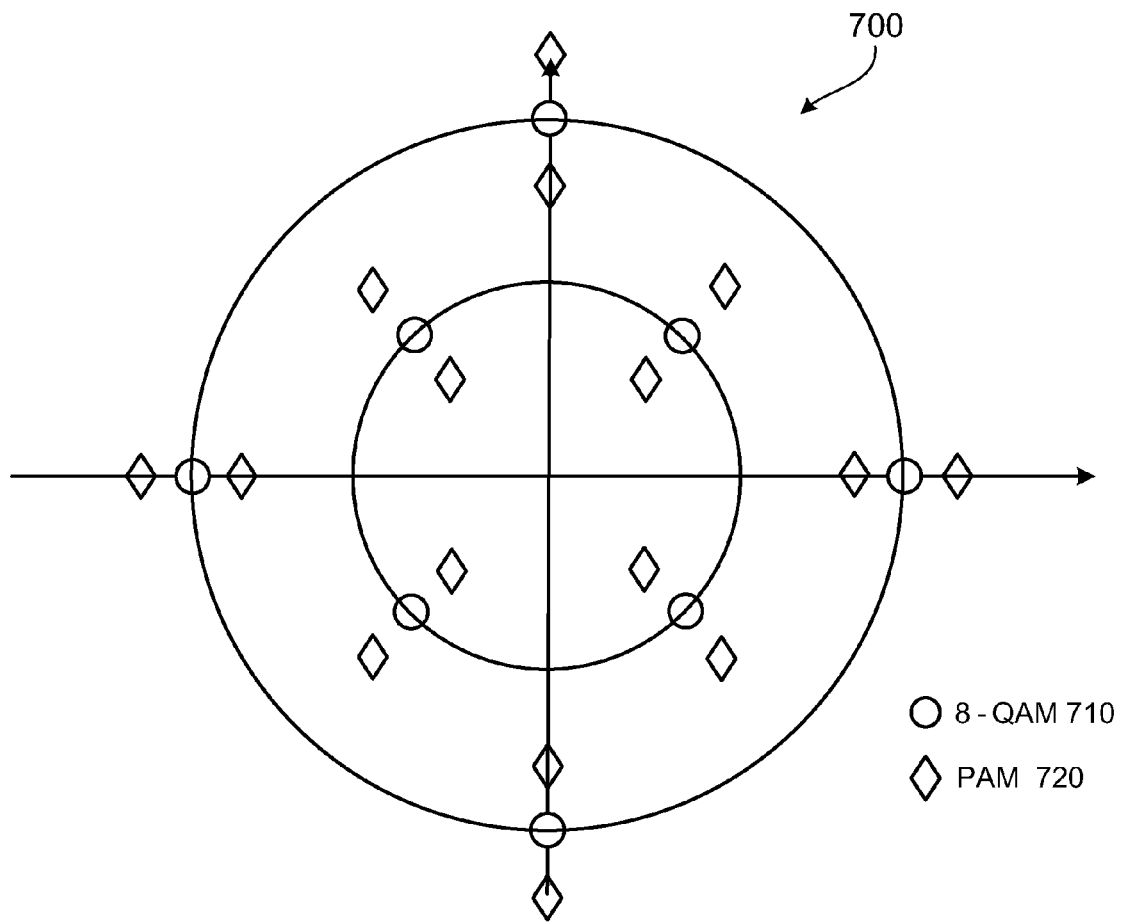
Figure 8:
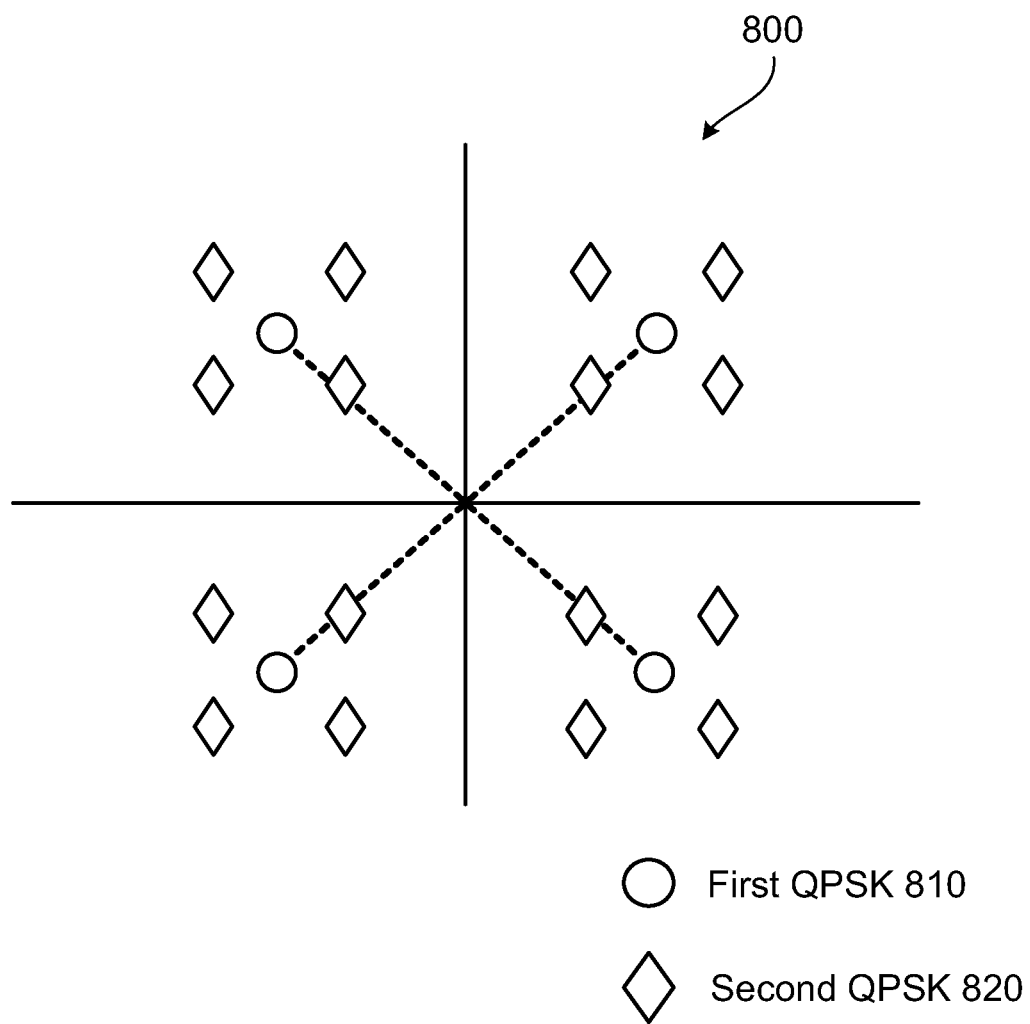

Referring now to FIG. 6 to FIG. 8, exemplary constellations 600, 700 and 800, respectively, of modulation schemes that can be used with the operations described herein are shown. As described above, a modulation scheme for legacy devices may be modified to transmit information suitable for the new generation devices. This may be viewed as using a modulation scheme "on top" of another existing modulation scheme. In the examples described above, pulse amplitude modulation (PAM) has been used on top of QPSK modulation which is used for the legacy devices. FIGS. 6-8 show other possible combination of modulation schemes. For example, FIG. 6 shows a constellation diagram 600 of a modulation scheme where 8-quadrature amplitude modulation (8-QAM) 610 is used for the legacy devices and QPSK 620 is used "on top" of the 8-QAM modulation scheme 610 to transmit information for the new generation devices. In other words, each constellation point from the 8-QAM 610 is used as an origin for a separate QPSK 620 (possibly rotated at an angle with respect to the coordinate system of the 8-QAM 610) constellation. Similarly. FIG. 7 shows a constellation diagram 700 of a modulation scheme where 8-QAM 710 is used for the legacy devices and PAM 720 is used in conjunction with the 8-QAM 710 to transmit information for the new generation devices. In this example, each constellation point corresponding to the 8-QAM 710 is used as an origin for a separate PAM 720 (possibly rotated at an angle with respect to the coordinate system of the 8-QAM 710) constellation. FIG. 8 shows a constellation diagram 800 of a modulation scheme where a first QPSK 810 is used for the legacy devices and another second QPSK 820 is used in conjunction with the first QPSK to transmit information for the new generation devices. In this example, each constellation point corresponding to the first QPSK 810 is used as an origin for a separate second QPSK 820 (possibly rotated at an angle with respect to the coordinate system of the first QPSK 810) constellation. Other combinations of modulation schemes are also possible without deviating from the scope of the present disclosure.

Figure 9:
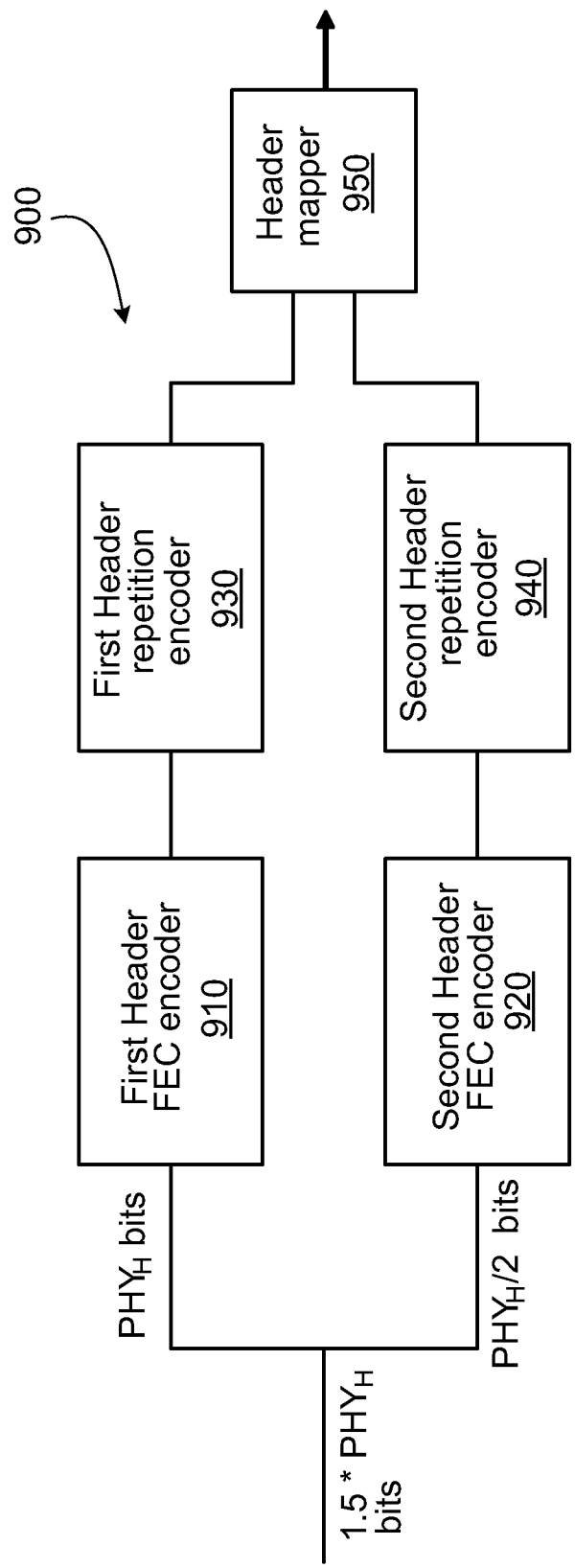
FIG. 9 is a block diagram of an exemplary scheme to encode header information for a hybrid modulation scheme.

In general, information about the modulation scheme used in a transmission is encoded in the header portion of a transmitted data packet. FIG. 9 is a block diagram 900 of an example scheme to encode header information for the hybrid modulation schemes described in this application. In the example shown in FIG. 9, the header information bits for a hybrid modulation scheme includes a frame of $PHY_H$ bits that provides interoperability and coexistence with existing (legacy) devices, and an additional $PHY_H/2$ bit frame that is available for advanced features supported in a new generation device. The two header frames are processed separately, sometimes, as shown in FIG. 9, in parallel. For example, the first frame (frame of $PHY_H$ bits in this example) passes through a first header FEC encoder 910 while the second frame (the $PHY_H/2$ bit frame in this example) passes through a second header FEC encoder 920. Typically, the header frames enter and get encoded in their respective FEC encoders in their original order. In some implementations, the first header FEC encoder 910 is substantially the same as the second header FEC encoder 920. In such cases the FEC encoders are configured to support both block sizes ($PHY_H$ and $PHY_H/2$ in this example) used for the headers. The FEC encoders produce encoded header frames at the respective outputs. The encoded frames can be longer than or substantially equal in size to the original header frames. For example, the first header FEC encoder 910 produces $2*PHY_H$ for each of the $PHY_H$ header bits at the input of the encoder 910.

In some implementations, the output of the header FEC encoder blocks are provided to respective header repetition encoders. In this example, the output of the first header FEC encoder 910 is provided to a first header repetition encoder 930 and the output of the second header FEC encoder 920 is provided to a second header repetition encoder 940. The first repetition encoder 930 replicates the 2*$PHY_H$ bits at the output of the header encoder 910 onto the set of supported sub-carriers for maximal spreading of the bit copies. For transmitting a single header-symbol, this is achieved by transmitting the copies of the interleaved bits consecutively (in some cases, with wrapping), with an address offset of $PHY_H$ between in-phase (I) and quadrature (Q) channels. Table 1 shows an example of bit ordering in such a transmission scheme for a single header-symbol case, where the variable c represents an index to the $c^{th}$ non-masked carrier and the variable NumCarriers represents the total number of non-masked carriers.

TABLE 1

| Used Carrier # | I-Channel Interleaved Bit Address | Q-Channel Interleaved Bit Address |
|---|---|---|
| 0 | 0 | $PHY_H$ |
| 1 | 1 | $PHY_H + 1$ |
| 2 | 2 | $PHY_H + 2$ |
| ... | ... | ... |
| c | c mod 2 * $PHY_H$ | (c + $PHY_H$) mod 2 * $PHY_H$ |
| ... | ... | ... |
| Num-Carriers-1 | (NumCarriers-1) mod 2 * $PHY_H$ | ((NumCarriers-1) + $PHY_H$) mod 2 * $PHY_H$ |

In case of transmitting two separate header symbols, the I and Q bit addresses for the first symbol can be substantially the same as shown in Table 1. In some implementations, the addresses of the bits in the I and Q channels for the second header symbol are substantially equal to the address of the corresponding bit in the first header symbol plus an additional offset of $PHY_H/2$. Example of such a bit ordering scheme for a two header-symbol case is shown in Table 2.

TABLE 2

| Used Carrier # | I-Channel Interleaved Bit Address Symbol 1 | Q-Channel Interleaved Bit Address Symbol 1 | I-Channel Interleaved Bit Address Symbol 2 | Q-Channel Interleaved Bit Address Symbol 2 |
|---|---|---|---|---|
| 0 | 0 | $PHY_H$ | $PHY_H/2$ | $PHY_H * (3/2)$ |
| 1 | 1 | $PHY_H + 1$ | $PHY_H/2 + 1$ | $PHY_H * (3/2) + 1$ |
| 2 | 2 | $PHY_H + 2$ | $PHY_H/2 + 2$ | $PHY_H * (3/2) + 2$ |
| ... | ... | ... | ... | ... |
| c | c mod 2 * $PHY_H$ | (c + $PHY_H$) mod 2 * $PHY_H$ | (c + $PHY_H/2$) mod 2 * $PHY_H$ | (c + $PHY_H * (3/2)$) mod 2 * $PHY_H$ |
| ... | ... | ... | ... | ... |
| Num-Carriers-1 | (NumCarriers-1) mod 2 * $PHY_H$ | ((NumCarriers-1) + $PHY_H$) mod 2 * $PHY_H$ | ((NumCarriers-1) + $PHY_H/2$) mod 2 * $PHY_H$ | ((NumCarriers-1) + $PHY_H * (3/2)$) mod 2 * $PHY_H$ |

The second repetition encoder 940 typically functions in an analogous manner to that of the first repetition encoder 930. In some implementations, the second repetition encoder 940 is configured to produce only one bit for each carrier (for example only the I component). For the case of a single header-symbol, the $PHY_H$ bits at the output of the second header encoder 920 can be read out in the same sequence multiple times. In such cases, in each consecutive readout, the polarity of the bits are inverted from the previous readout. For example, if the output of the second header encoder 920 is the block of bits $b_0, b_1, b_2, \ldots, b_{Phyh-1}$, then the bit sequence on the set of supported carriers can be as shown, for example, in Table 3. The header repetition shown in Table 3 can continue until all supported carriers of the frame control are allocated a bit. In the case of a two-symbol PHY-frame header the same scheme can continue as if there were twice as many carriers.

TABLE 3

| Carrier # | Bit | Carrier # | Bit | Carrier # | Bit | Carrier # | Bit |
|---|---|---|---|---|---|---|---|
| 0 | $b_0$ | $PHY_H$ | $1-b_0$ | $2PHY_H$ | $b_0$ | $3PHY_H$ | $1-b_0$ |
| 1 | $b_1$ | $PHY_H+1$ | $1-b_1$ | $2PHY_H+1$ | $b_1$ | $3PHY_H+1$ | $1-b_1$ |
| 2 | $b_2$ | $PHY_H+2$ | $1-b_2$ | $2PHY_H+2$ | $b_2$ | ... | ... |
| ... | ... | ... | ... | ... | ... | ... | ... |
| $PHY_H-1$ | $b_{Phyh-1}$ | $2PHY_H-1$ | $1-b_{Phyh-1}$ | $3PHY_H-1$ | $b_{Phyh-1}$ | ... | ... |

Typically, the bits produced by the header repetition encoders (3 bits for each carrier in the above example) are mapped to constellation points by a header mapper 950. The bits are grouped in accordance with the various header frames and modulation schemes. Continuing with the above example, two bits ($b_0, b_1$) represent the $PHY_H$ bit header and come from the first header repetition encoder 930. These bits are used to define a 2-bit constellation point. A third bit ($b_2$) represents the $PHY_H/2$ bit header and comes from the second header repetition encoder 940. In this example, the third bit $b_2$ defines an amplitude multiplier (a "sub-constellation") for the 2-bit constellation point defined using $b_0$ and $b_1$, yielding a 3-bit combined constellation. An exemplary combined constellation produced by the combination of these three bits is represented below in Table 4.

TABLE 4

| $b_2 b_1 b_0$ | I | Q |
|---|---|---|
| 000 | $-0.7/\sqrt{0.7^2+3^2}$ | $-0.7/\sqrt{0.7^2+3^2}$ |
| 001 | $0.7/\sqrt{0.7^2+3^2}$ | $-0.7/\sqrt{0.7^2+3^2}$ |
| 010 | $-0.7/\sqrt{0.7^2+3^2}$ | $0.7/\sqrt{0.7^2+3^2}$ |
| 011 | $0.7/\sqrt{0.7^2+3^2}$ | $0.7/\sqrt{0.7^2+3^2}$ |
| 100 | $-3/\sqrt{0.7^2+3^2}$ | $-3/\sqrt{0.7^2+3^2}$ |

TABLE 4-continued

| $b_2 b_1 b_0$ | I | Q |
|---|---|---|
| 101 | $3/\sqrt{0.7^2+3^2}$ | $-3/0.72 + 32$ |
| 110 | $-3/\sqrt{0.7^2+3^2}$ | $3/\sqrt{0.7^2+3^2}$ |
| 111 | $3/\sqrt{0.7^2+3^2}$ | $3/\sqrt{0.7^2+3^2}$ |

Figure 10A:
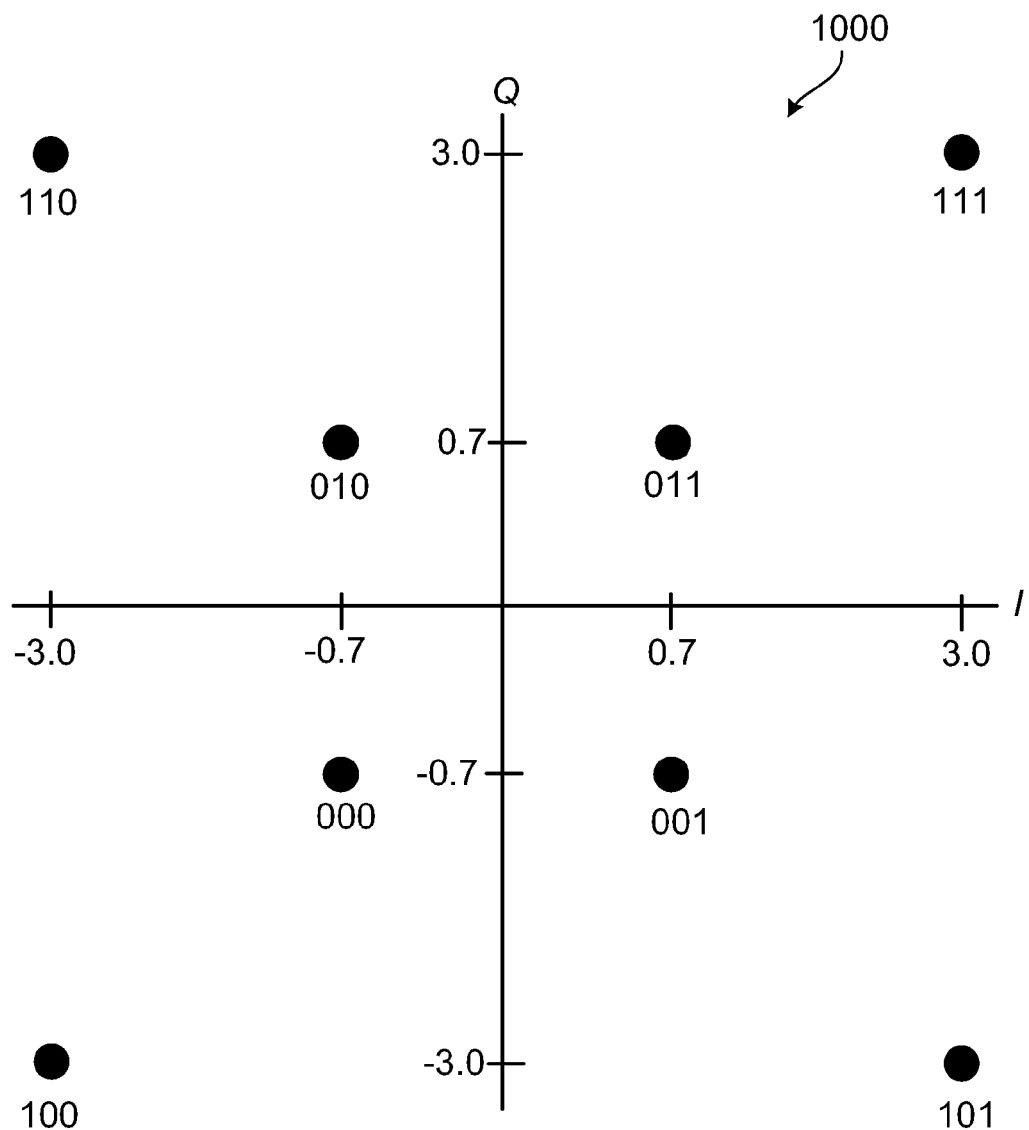
FIGS. 10A and 10B are constellation diagrams.

FIG. 10A shows a constellation diagram 1000 corresponding to the bit-groups represented in Table 4, with each point in the constellation labeled by the corresponding bits mapped to that point $b_2 b_1 b_0$ (in that order). In this example, the amplitudes of the data points as shown in FIG. 10A are multiplied by a scaling factor of $1/\sqrt{0.7^2+3^2}$. As seen from FIG. 10A, the bits $b_0$ and $b_1$ form a 2-bit constellation diagram, e.g., a QPSK in this example. The bit $b_2$ represents an amplitude scaling of the corresponding constellation point. If such a modulation scheme is used in a system comprising both legacy and new generation devices, the devices first determine which quadrant a received point lies in. A new generation device can then differentiate between the amplitudes of the received point in the given quadrant to glean further information whereas a legacy device can simply ignore the amplitude value. For example, in such a system both legacy and new generation devices can decode a first quadrant point as '11'. The new generation devices can then test the amplitude of the received point to determine whether the transmitted point is '011' or '111' (corresponding to a value of bit $b_2$ of '0' or '1'). Legacy devices do not need such granularity and continue processing the bit-group '11'.

Figure 10B:
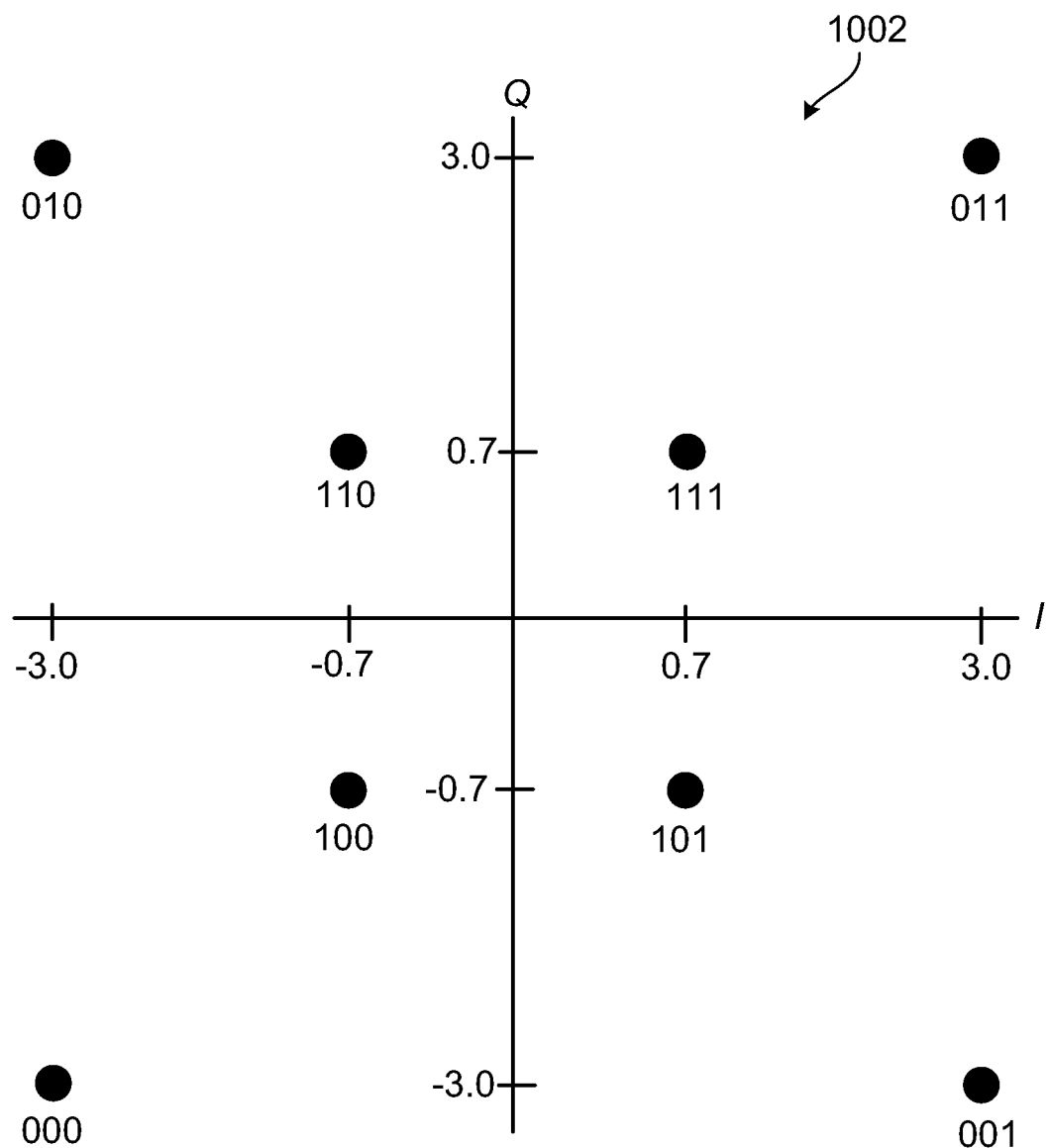

Using the repetition encoder 940, a signal includes multiple copies of the information represented by $b_2$, with each copy being modulated on a different respective carrier of the signal. In some implementations, at least some of the carriers are modulated using different mappings between points in the sub-constellation and the "auxiliary information bit" $b_2$. For example, in the example above, each copy is modulated on a respective carrier using points in the sub-constellation that have different amplitudes in the different mappings. FIG. 10B shows a constellation diagram 1002 that uses a different mapping between points in the sub-constellation and "auxiliary information" bit $b_2$. In this example, the "main information" bits $b_0$ and $b_1$ are also copied (by encoder 930) on the same respective carriers and each copy of the "auxiliary information" bit $b_2$ is modulated along with the same copy of the "main information" bits $b_o$ and $b_1$. However, for copies on successive carriers, the mapping can be toggled between constellations 1000 and 1002 such that the same value of $b_2$ on successive carriers (e.g., $b_2$='0') is represented by different amplitudes $0.7/\sqrt{0.7^2+3^2}$ and $3/\sqrt{0.7^2+3^2}$, respectively. For example, a given set of carriers may be modulated with copies having the same values of the two bits $b_0$ and $b_1$ from encoder 930 and alternative copies may be modulated with different mappings of $b_2$ (using constellation 1000 and constellation 1002) from encoder 940. An advantage in maintaining this relationship is that if the amplitude of a given value of $b_2$ from encoder 940 is toggled on successive copies of the bits $b_2$ $b_1$ $b_0$, then combining all of the copies (e.g., using maximum ratio combining of the copies, or an average of the copies) yields approximately the same probability of error for $b_0$ and $b_1$, regardless of the value of $b_2$ from encoder 940, thus improving the decoding reliability of $b_0$ and $b_1$ from encoder 930 for both legacy and next generation receivers. For example, if a total number of copies modulated using a point having a first of two different amplitudes is approximately equal to a total number of copies modulated using a point having a second of the two different amplitudes, and the copies are combined when demodulating, then the total combined energy will be intermediate between the two, and can be used for consistently detecting that intermediate energy of copies of the "main information bits" $b_o$ and $b_1$ in a legacy receiver. This alternating mapping is an option, for example, when the number of legacy header information bits ("main information bits") is equal to a whole number multiple of the next generation header information bits ("auxiliary information bits").

Figure 11:
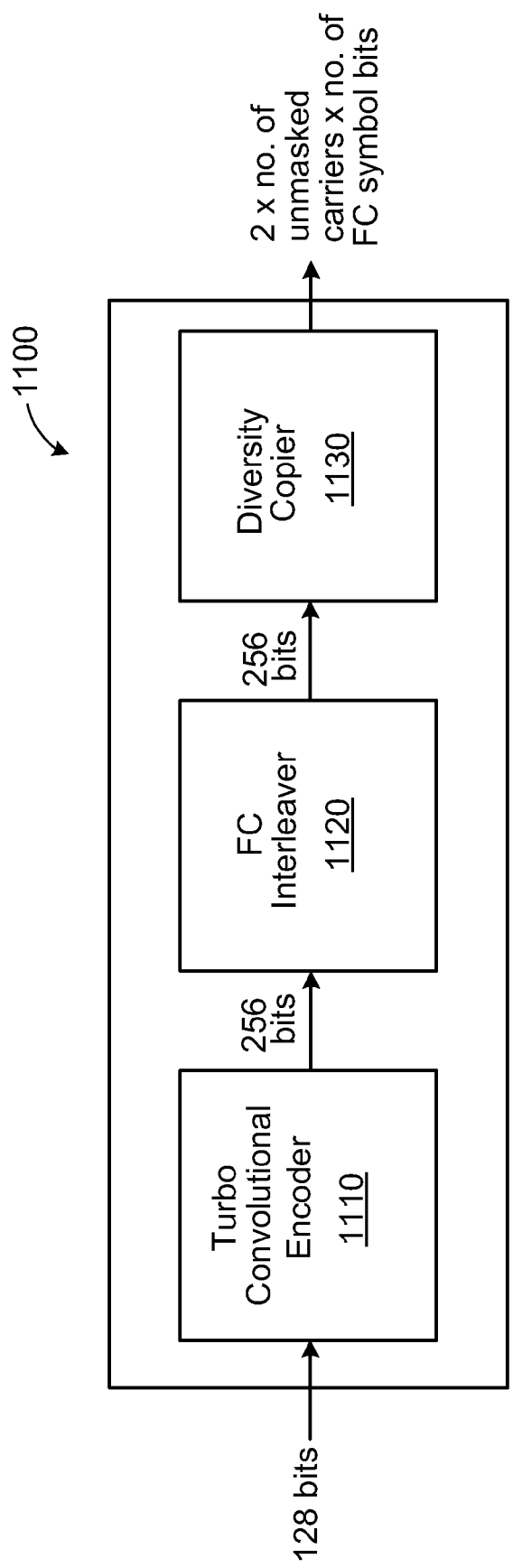
FIG. 11 is a block diagram of an exemplary FEC encoder.

FIG. 11 shows a block diagram for an exemplary FEC encoder 1100. In the example shown, the FEC encoder 1100 processes 128 frame control (FC) bits. In some implementations, the FEC encoder 1100 can include a turbo convolutional encoder 1110 that encodes 128 Frame Control bits into 256 coded bits, a frame control interleaver 1120, and a diversity copier 1130 that redundantly maps the 256 interleaved bits onto one or two OFDM symbols. The bits of data (e.g., 2×no. of unmasked carriers×number of FC symbol bits) output from the diversity copier 1130 are mapped into coherent QPSK. The mapping function for frame control information is typically specified using a tone mask. Exemplary mapping schemes for BPSK, QPSK, 8-QAM, 16-QAM, 64-QAM, 256-QAM, 1024-QAM are shown in the Appendix 2 of U.S. Provisional Application 61/235,338, incorporated herein by reference.

In some implementations, the frame control field consists of 128 information bits. These bits are encoded and coherently QPSK modulated over one or two OFDM symbols. In some implementations, to obtain a high reliability in the demodulation of the control bits, a frequency-diversity mode can be implemented. The use of two symbols for the frame control, when used, can increase frame control robustness, especially in bandwidth-limited cases.

Figure 12:
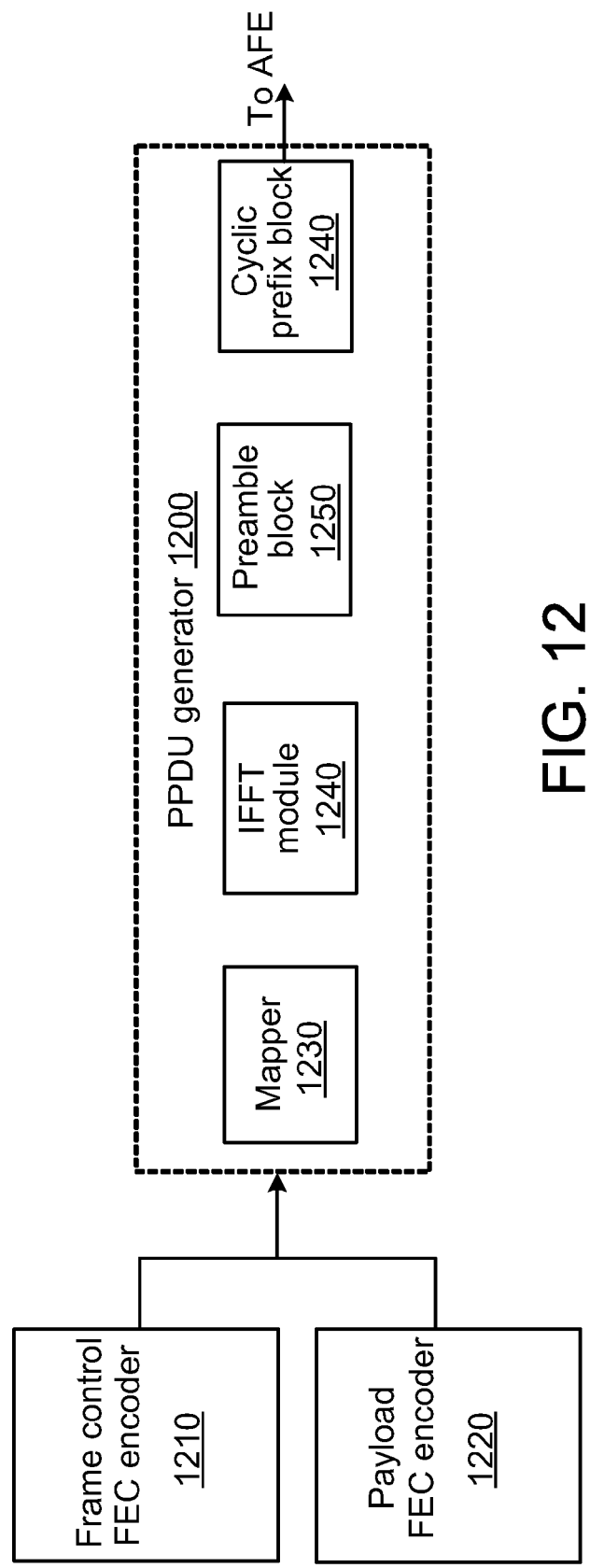
FIG. 12 is a block diagram of an exemplary PPDU generator.

FIG. 12 shows a block diagram of an exemplary PPDU generator 1200. In some implementations, outputs from a frame control FEC encoder 1210 and a payload FEC encoder 1220 are processed by the PPDU generator 1200 and the output passed on to the analog front end (AFE). The AFE transmits the signal over the medium. The PPDU generator 1200 can include a mapper 1230 that maps groups of data bits onto a constellation point (e.g., BPSK, QPSK, 8-QAM, 16-QAM, 64-QAM, 256-QAM, or 1024-QAM) and an IFFT module 1240 that performs the modulation of the constellation points onto the carrier waveforms (in discrete time). The PPDU generator 1200 also includes a preamble block 1250 that inserts a preamble signal used for automatic gain control and synchronization, as well as the channel reference for the frame control signal encoding. The PPDU generator 1200 further includes a cyclic prefix block 1240 that processes the outputs of the IFFT block into a sequence of OFDM symbols by prepending a cyclic prefix, pulse shaping the symbol, and overlapping each OFDM symbol with the preceding OFDM symbol.

Figure 13:
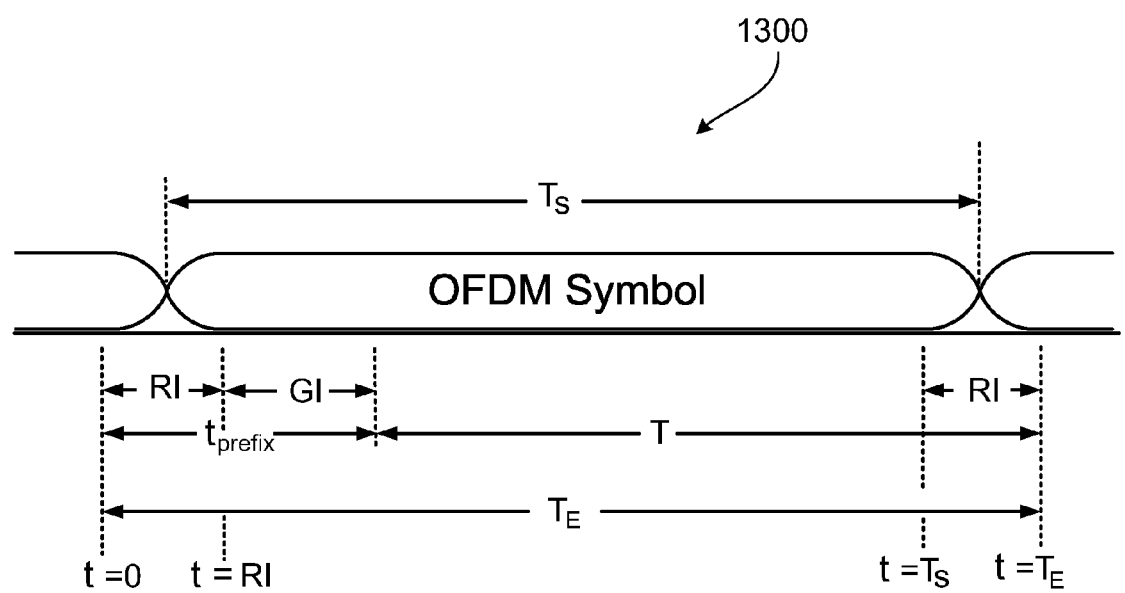
FIG. 13 is an exemplary timing diagram of an OFDM symbol.

FIG. 13 shows an exemplary timing diagram 1300 for an OFDM symbol. In this example, the OFDM time domain signal, based on a 75 MHz system clock, is determined as follows. For AV Frame Control and Payload Symbols, a set of data points from the mapper 1230 is modulated onto the subcarrier waveforms using a 3072-point Inverse Fast Fourier Transform (IFFT) that results in 3072 time samples (IFFT interval). A fixed number of samples from the end of the IFFT are taken and inserted as a cyclic prefix at the front of the IFFT interval to create an extended OFDM symbol. Table 5 defines the various timing parameters related to the OFDM symbol shown in the example of FIG. 13.

TABLE 5

| Symbol | Description | Time Samples | Time(Microseconds) |
|---|---|---|---|
| T | IFFT Interval | 3072 | 40.96 |
| $t_{prefix}$ | Cyclic Prefix Interval | RI + GI | 4.96 + GI |
| $T_E$ | Extended Symbol Interval (T + tprefix) | T + tprefix | 45.92 + GI |
| RI | Rolloff Interval | 372 | 4.96 |
| $T_S$ | Symbol Period | 3072 + GI | 40.96 + GI |
| $GI_{FC}$ | Frame Control Guard Interval | 1374 | 18.32 |
| GI | Payload Symbol Guard Interval, generically | 417, 567, 3534 | 5.56, 7.56, 47.12 |

TABLE 5-continued

| Symbol | Description | Time Samples | Time(Microseconds) |
|---|---|---|---|
| $GI_{SR}$ | STD-ROBO_AV Payload Symbol(s) Guard Interval | 417 | 5.56 |
| $GI_{HR}$ | HS-ROBO_AV Payload Symbol(s) Guard Interval | 417 | 5.56 |
| $GI_{MR}$ | MINI-ROBO_AV Payload Symbol(s) Guard Interval | 567 | 7.56 |
| $GI_{417}$ | Guard Interval, length = 417 samples | 417 | 5.56 |
| $GI_{567}$ | Guard Interval, length = 567 samples | 567 | 7.56 |
| $GI_{3534}$ | Guard Interval, length = 3534 samples | 3534 | 47.12 |

Typically the carriers in an OFDM symbol differ in phase from each other. In some implementations, a phase reference ϕ is used as an initial phase and the other phases calculated with respect to the initial phase. In such cases, actual phase for each carrier is defined as the carrier's phase angle number multiplied by π/4. An example of such phase mapping is shown in Table 6-15 of the Appendix 2 of U.S. Provisional Application 61/235,338, incorporated herein by reference. An example of equations for generating waveforms for frame control symbols are included in section 1.2.5.2.3 of the Appendix 2 of U.S. Provisional Application 61/235,338.

Regardless of the combination of modulation schemes used to transmit the bits, the receiver performs substantially inverse operations to recover the bits from the received signals. In general, the main information is demodulated and decoded first and the knowledge related to the main information is then used to demodulate and decode the auxiliary information. In some implementations, the receiver first demodulates the main information to converge to at least a region in the first constellation. If the receiver is a legacy device, the bit sequences are recovered based on the location of this region only. If the receiver is a new generation device, the receiver is capable of demodulating the auxiliary information by determining a sub region in this region of the first constellation. In some implementations, the receiver may determine a constellation point in the sub constellation to demodulate the auxiliary information. The operations at the receiver are illustrated below with the help of an example.

In this example, a PAM modulation scheme is used to modulate the auxiliary information while a QPSK modulation scheme is used for modulating the main information. The receiver first demodulates and decodes the main information. This may also include rotating the recovered point such that it lies on the real axis of the constellation diagram. In some implementations, the transmitter transmits repeated copies of the main information. In such cases, the receiver combines the multiple copies of the main information. This may be viewed as the inverse operation of copy coding of the main information at the transmitter and is referred to as copy combining. The copy combined main information is then error corrected, for example via forward error correction (FEC) decoding, to obtain the main information as sent on various carriers. In some implementations, proper decoding and demodulation of the auxiliary information depends on the main information. Therefore, proper demodulation, decoding and error correction of the main information decreases the probability of error in decoding the auxiliary information.

A new generation device then carries out further processing to demodulate and decode the auxiliary information which are the PAM bits in this example. Since copy coding is also used for auxiliary information and more than one amplitude is used at the transmitter to deliberately introduce diversity in the copies of the PAM bits, the receiver carries out corresponding inverse operations. In the present example, two amplitudes $A_1$ and $A_2$ were used for the two copies of the PAM bit and the amplitude $A_2$ was obtained on the constellation diagram by reflecting the amplitude $A_1$ with respect to the mid point of the line segment connecting $A_1$ and $A_2$. Accordingly, an inverse operation is carried out at the receiver, i.e. $A_2$ is reflected back with respect to the mid point of the line segment connecting $A_1$ and $A_2$. A metric is then calculated for each inverse transformed copy of the PAM bit and the metrics are then combined to obtain the combined metric for decoding the PAM bit. Such a combination may be viewed as an inverse operation to the copy coding done at the transmitter and is therefore the copy combining of the auxiliary information. In some implementations, the receiver also compensates for errors in the auxiliary information introduced in the channel by performing additional functions such as error detection and error correction. Error detection may be performed via any error detection code. An example of such an error detection code is cyclic redundancy check (CRC) bits embedded in the data frame by the transmitter. The receiver may also perform error correction of the auxiliary information via operations such as forward error correction (FEC) decoding. As with the main information, the FEC decoding of the auxiliary information is done after the copy combining.

As described above, in some implementations, multiple copies of both the main information and the auxiliary information are sent. In some implementations an equal number of copies may be sent for both the main information and the auxiliary information. For example, each of the main information and the auxiliary information may be sent 7 times. In some implementations, copies of the auxiliary information are encoded on the corresponding copy of the main information. In other words, the first copy of the auxiliary information is encoded on the first copy of the main information, the second copy of the auxiliary information is encoded on the second copy of the main information and so on. In some implementations, the number of copies of the auxiliary information is an integer multiple of the number of copies of the main information. For example, the main information may be copied 7 times while the auxiliary information is copied 14 times. In such cases, the ordering may be modified by modulating the first two copies of the auxiliary information on the first copy of the main information and so on. In some cases, other ordered pairings of the main information and the auxiliary information copies are also possible. For example, every $7^{th}$ copy of the auxiliary information in the above example may be encoded on a particular copy of the main information.

While the above example illustrates the process of recovering the auxiliary information with respect to a QPSK-PAM modulation scheme, similar operations are followed for other combined modulation schemes. In general, the receiver essentially performs inverse operations to the operations carried out at the transmitter.

Many other implementations of the invention other than those described above are within the invention, which is defined by the following claims.

What is claimed is:

1. A method for transmitting information to stations in a network, the method comprising:
 modulating first main information and a first copy of auxiliary information onto a first carrier of a signal, the first main information being modulated using a first selected region of a constellation having multiple regions, and the first copy of auxiliary information being modulated using a first selected point of a sub-constellation having multiple points within the first selected region;

modulating second main information and a second copy of the auxiliary information onto a second carrier of the signal, the second main information being modulated using a second selected region of the constellation, and the second copy of the auxiliary information being modulated using a second selected point of a same sub-constellation within the second selected region, wherein the second selected point associated with the second copy of the auxiliary information occurs at a different portion of the sub-constellation than the first selected point associated with the first copy of the auxiliary information, wherein the first selected point and the second selected point alternate between multiple portions of the sub-constellation and a mapping for the first selected point and the second selected point alternate bit values; and transmitting the signal from a first station in the network to a second station in the network.

2. The method of claim 1, further comprising modulating third main information and an additional copy of the auxiliary information onto a third carrier of the signal according to the constellation, with the third main information being modulated using a third selected region of the constellation, and the additional copy of the auxiliary information being modulated using a third selected point of the sub-constellation within the third selected region that occurs at a portion of the sub-constellation corresponding to the first selected point or the selected second point.

3. The method of claim 1, wherein the signal includes multiple copies of the auxiliary information, with each copy being modulated on a respective carrier of the signal, and at least a subset of the carriers are modulated using different mappings between points in the sub-constellation and auxiliary information bits.

4. The method of claim 1, wherein each of the first copy of the auxiliary information and the second copy of the auxiliary information is modulated on a different respective carrier of the signal using points in the sub-constellation having different amplitudes.

5. The method of claim 4, wherein a total number of copies of the auxiliary information modulated using a point having a first of the different amplitudes is approximately equal to a total number of copies of the auxiliary information modulated using a point having a second of the different amplitudes.

6. The method of claim 1, wherein the first of the signal and the second carrier of the signal are both included in at least one symbol of the signal.

7. The method of claim 6, wherein the signal includes orthogonal frequency division multiplexing (OFDM) symbols each including multiple carriers having different frequencies separated by integral multiples of an inverse of a time duration of the OFDM symbols.

8. The method of claim 1, wherein the auxiliary information is encoded as N bits, where N>1, and the multiple points of the sub-constellation consist of 2n points, each point representing a different sequence of N bits.

9. The method of claim 1, further comprising transmitting the signal from the first station in the network to a third station in the network.

10. The method of claim 9, wherein the third station demodulates the first main information and the second main information using the regions of the constellation, and demodulates the auxiliary information using the points in the sub-constellation.

11. The method of claim 1, wherein the second station demodulates the first main information and the second main information using the regions of the constellation.

12. The method of claim 11, wherein the second station ignores the auxiliary information.

13. The method of claim 1, wherein the first station modulates copies of the first main information onto multiple respective carriers of the signal and modulates copies of the auxiliary information onto multiple respective carriers of the signal.

14. The method of claim 13, wherein multiple carriers of the signal that carry copies of the first main information also carry copies of the auxiliary information.

15. The method of claim 1, wherein the first station modulates copies of the first main information onto each of multiple respective carriers of the signal and modulates copies of the auxiliary information onto each of the same respective carriers of the signal.

16. The method of claim 11, wherein the second station demodulates the auxiliary information using the points in the sub-constellation.

17. The method of claim 16, wherein the second station demodulates the first copy of the auxiliary information using points in the sub-constellation after demodulating the first main information, and demodulates the second copy of the auxiliary information based on points in the sub-constellation after demodulating the second main information.

18. The method of claim 1, wherein the first station selectively includes the auxiliary information in the signal based on determining whether the signal is destined for at least one station capable of demodulating the auxiliary information.

19. The method of claim 1, wherein the first main information and the second main information each comprise a portion of main frame control information related to transmission of a frame over the network, and the auxiliary information comprises auxiliary frame control information related to transmission of the frame over the network.

20. The method of claim 19, wherein the main frame control information and auxiliary frame control information are broadcast to multiple of the stations in the network.

21. The method of claim 1, wherein the first main information and second main information are transmitted for reception by a legacy device that is incapable of decoding the auxiliary information, and wherein the first copy of the auxiliary information and second copy of the auxiliary information are transmitted for reception by a new generation device that is capable of decoding the auxiliary information.

22. The method of claim 1, wherein the first selected region of the constellation in the first carrier of the signal overlaps with the second selected region of the constellation in the second carrier of the signal.

23. The method of claim 1, wherein when the first and second copies of the auxiliary information are combined by a legacy device configured to demodulate the signal, a combined energy of the first and second copies of the auxiliary information is associated with an intermediate energy of main information carried in a particular region of the constellation.

24. A method comprising:

receiving a signal at a first station in a network from a second station in the network;

demodulating first main information and a first copy of auxiliary information from a first of the signal according to a predetermined constellation, demodulating the first main information including measuring at least one of a phase angle and amplitude of the first of the signal, and demodulating the first copy of the auxiliary information including measuring at least one of a phase angle and amplitude of the first carrier of the signal transformed in relation to a demodulation of the first main information;

demodulating second main information and a second copy of the auxiliary information from a second carrier of the signal according to the predetermined constellation, demodulating the second main information including measuring at least one of a phase angle and amplitude of the second carrier of the signal, and demodulating the second copy of the auxiliary information including measuring at least one of a phase angle and amplitude of the second carrier of the signal transformed in relation to a demodulation of the second main information; and estimating the auxiliary information based on a combination of the measurement of the first carrier of the signal and the measurement of the second carrier of the signal, wherein a first selected point of the predetermined and a second selected point of the predetermined constellation alternative between multiple portions of the predetermined constellation and a mapping for the first selected point and the second selected point alternate bit values.

25. The method of claim 24, wherein the signal includes multiple copies of the auxiliary information, with each copy being modulated on a respective carrier of the signal, and at least a subset of the carriers are modulated using different mappings between points in the constellation and auxiliary information bits.

26. The method of claim 24, wherein each of the first copy of the auxiliary information and the second copy of the auxiliary information is modulated on a different respective carrier of the signal using points in the constellation having different amplitudes.

27. The method of claim 24, wherein the first carrier of the signal and the second carrier of the signal are both included in at least one symbol of the signal.

28. The method of claim 27, wherein the signal includes orthogonal frequency division multiplexing (OFDM) symbols each including multiple carriers having different frequencies separated by integral multiples of an inverse of a time duration of the OFDM symbols.

29. The method of claim 24, wherein the first main information and the second main information each comprise a portion of main frame control information related to transmission of a frame over the network, and the auxiliary information comprises auxiliary frame control information related to transmission of the frame over the network.

30. The method of claim 29, wherein the main frame control information and auxiliary frame control information are broadcast to multiple of the stations in the network.

31. A method comprising:
modulating main information on carriers of a signal according to a first level of a hierarchical modulation scheme associated with a constellation; and
modulating auxiliary information on carriers of the signal according to a second level of the hierarchical modulation scheme associated with a sub-constellation of the constellation,
wherein the signal includes multiple copies of the auxiliary information with each copy of the auxiliary information being modulated on a respective carrier of the signal, wherein a first selected point of the sub-constellation and a second selected point of the sub-constellation alternate between multiple portions of the sub- constellation and a mapping for the first selected point and the second selected point alternate bit values.

32. The method of claim 31, further comprising:
transmitting the signal from a first station in a network to a second station in the network.

33. The method of claim 31, wherein each copy of the auxiliary information is modulated using the first and second selected points in the sub-constellation having different amplitudes.

34. The method of claim 33, wherein a total number of copies of the auxiliary information modulated using the first selected point having a first of the different amplitudes is approximately equal to a total number of copies of the auxiliary information modulated using the second selected point having a second of the different amplitudes.

35. The method of claim 31, further comprising:
determining whether the signal is destined for at least one station capable of demodulating the auxiliary information,
wherein modulating the auxiliary information in the signal is responsive to determining that the signal is destined for at least one station capable of demodulating the auxiliary information.

36. The method of claim 31, wherein the main information is transmitted for reception by a legacy device that is incapable of decoding the auxiliary information, and wherein the auxiliary information is transmitted for reception by a new generation device that is capable of decoding the auxiliary information.

37. A first station, comprising:
a transmitter configured to:
modulate first main information and a first copy of auxiliary information onto a first carrier of a signal, the first main information being modulated using a first selected region of a constellation having multiple regions, and the first copy of auxiliary information being modulated using a first selected point of a sub-constellation having multiple points within the first selected region;
modulate second main information and a second copy of the auxiliary information onto a second carrier of the signal, the second main information being modulated using a second selected region of the constellation, and the second copy of the auxiliary information being modulated using a second selected point of a same sub-constellation within the second selected region, wherein the second selected point associated with the second copy of the auxiliary information occurs at a different portion of the sub- constellation than the first selected point associated with the first copy of the auxiliary information, wherein the first selected point and the second selected point alternate between multiple portions of the sub-constellation and a mapping for the first selected point and the second selected point alternate bit values; and
transmit the signal from the first station to a second station in a network.

38. The first station of claim 37, wherein the transmitter is further configured to:
modulate third main information and an additional copy of the auxiliary information onto a third carrier of the signal according to the constellation, with the third main information being modulated using a third selected region of the constellation, and the additional copy of the auxiliary information being modulated using a third selected point of the sub- constellation within the third selected region that occurs at a portion of the sub-constellation corresponding to the first selected point or the selected second point.

39. The first station of claim 37, wherein the signal includes multiple copies of the auxiliary information, with each copy being modulated on a respective carrier of the signal, and at least a subset of the carriers are modulated using different mappings between points in the sub-constellation and auxiliary information bits.

40. The first station of claim 37, wherein each of the auxiliary information and the copy of the auxiliary information is modulated on a different respective carrier of the signal using points in the sub-constellation having different amplitudes.

41. The first station of claim 40, wherein a total number of copies of the auxiliary information modulated using a point having a first of the different amplitudes is approximately equal to a total number of copies of the auxiliary information modulated using a point having a second of the different amplitudes.

42. The first station of claim 37, wherein the first carrier of the signal and the second carrier of the signal are both included in at least one symbol of the signal.

43. The first station of claim 42, wherein the signal includes orthogonal frequency division multiplexing (OFDM) symbols each including multiple carriers having different frequencies separated by integral multiples of an inverse of a time duration of the OFDM symbols.

44. The first station of claim 37, wherein the transmitter is configured to modulate copies of the first main information onto multiple respective carriers of the signal and modulate copies of the auxiliary information onto multiple respective carriers of the signal.

45. The first station of claim 44, wherein multiple carriers of the signal that carry copies of the first main information also carry copies of the auxiliary information.

46. The first station of claim 37, wherein the transmitter is configured to modulate copies of the first main information onto each of multiple respective carriers of the signal and modulate copies of the auxiliary information onto each of the same respective carriers of the signal.

47. The first station of claim 37, wherein the transmitter selectively includes the auxiliary information in the signal based on determining whether the signal is destined for at least one station capable of demodulating the auxiliary information.

48. The first station of claim 37, wherein the first main information and the second main information each comprise a portion of main frame control information related to transmission of a frame over the network, and the auxiliary information comprises auxiliary frame control information related to transmission of the frame over the network.

49. The first station of claim 48, wherein the main frame control information and auxiliary frame control information are broadcast to multiple of the stations in the network.

\* \* \* \* \*